Oct. 17, 1933.   I. M. LADDON ET AL   1,930,720
AEROPLANE RUNNING GEAR
Filed Aug. 15, 1927

INVENTOR
ISSAC M. LADDON
SIDNEY P. LYON
BY
ATTORNEY

Patented Oct. 17, 1933

1,930,720

UNITED STATES PATENT OFFICE 1,930,720

AEROPLANE RUNNING GEAR

Isaac M. Laddon, Dayton, and Sidney P. Lyon, Tippecanoe City, Ohio; said Laddon assignor to Bendix Aviation Corporation, South Bend, Ind., a corporation of Delaware, and said Lyon assignor to Bendix Brake Company, Chicago, Ill., a corporation of Illinois Application August 15, 1927. Serial No. 212,974

7 Claims. (Cl. 244—2)

This invention relates to landing gear for aeroplanes and the like, and is illustrated as embodied in a mounting for one of the wheels of a plane including a novel shock absorbing means which prevents rebounding of the plane upon landing.

One feature of the invention relates to arranging the parts of the novel shock absorbing means within a dished wheel so that the shock absorbing means comes substantially in the load plane of the wheel. Preferably the shock absorbing means includes a fluid-containing cylinder and a piston arranged to force oil or other fluid from one side of the piston to the other to absorb the kinetic energy of the vertical component of movement of the plane in landing. In the arrangement shown in the drawing, there is a device such as a tapered plunger which gradually throttles the movement of the fluid during the piston stroke. When the plane is on the ground the load is transmitted directly to the wheel spindle by means such as a block of rubber or the like.

Another feature of the invention relates to the mounting of the wheel on a spindle extending at one end of a mounting part which is formed at its other end with a vertical fluid-containing cylinder forming part of the above-described shock absorbing means.

Other objects and features of the invention, including a novel wheel construction and other novel combinations of parts and desirable particular constructions, will be apparent from the following description of one illustrative embodiment shown in the accompanying drawing, in which.

Figure 1:
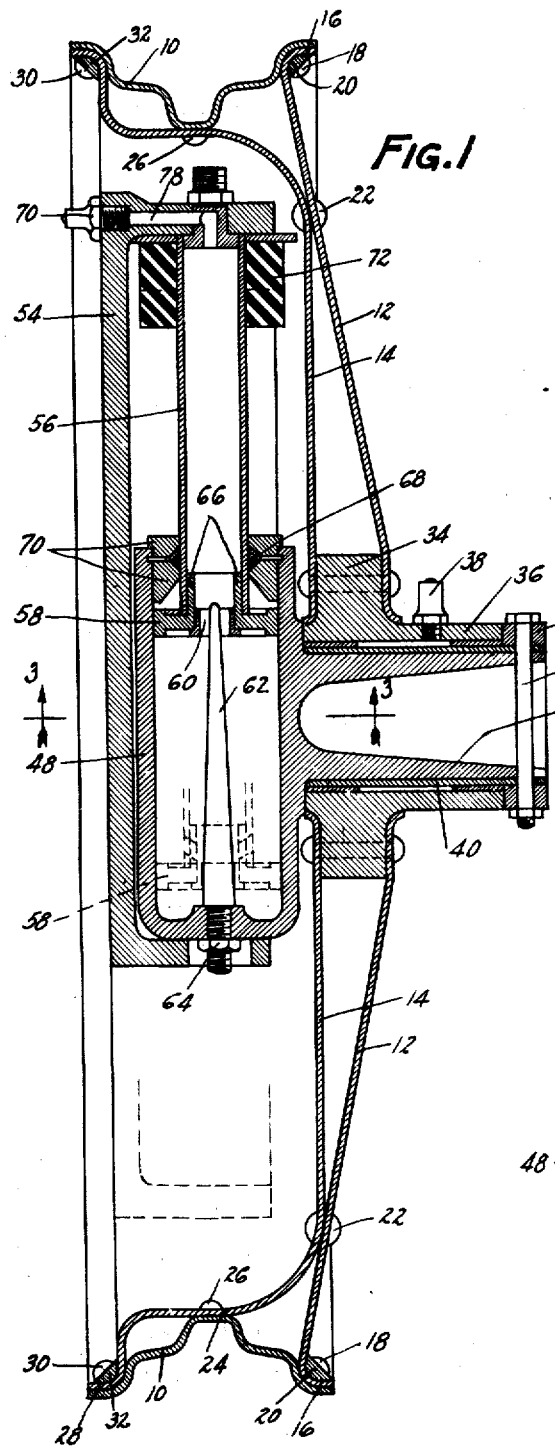
Figure 1 is a vertical section through one wheel and its associated shock absorbing means.
Figure 2:
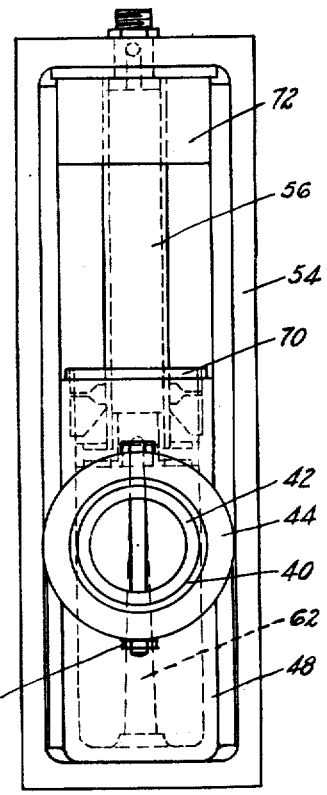
Figure 2 is a side elevation of the cylinder and piston and associated parts, looking from the right in Figure 1.
Figure 3:
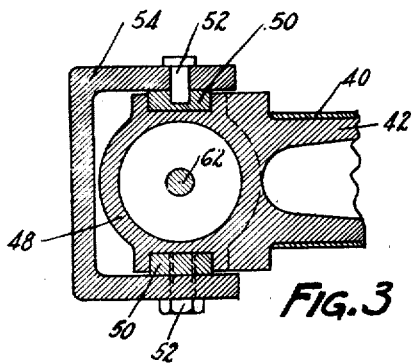
Figure 3 is a partial section on the line 3—3 of Figure 1 and showing the mounting of the wheel to permit vertical movement.

In the arrangement illustrated, the wheel proper includes a drop center rim 10, for a demountable tire of any desired form, and two disks 12 and 14. The disk 12 is secured to the rim 10 at one side, for example by forming a flange 16 underlapping the edge flange of the rim and secured thereto by fastenings such as rivets 18 passing through attaching blocks 20. The disk 14 is preferably secured to the disk 12 by fastenings such as rivets 22 and is then dished inwardly to form a part 24 engaging and secured by rivets 26 or the like to the bottom of the drop center of the rim 10. The disk 14 is then continued inwardly to form an edge flange 28 underlapping the side flange of the rim 10 opposite the one secured to the disk 12, and secured thereto by means such as rivets 30 passing through blocks 32. At their inner edges the disks 12 and 14 are secured to opposite sides of a flange 34 forming part of a hub 36 (shown with a lubricant fitting 38) sleeved on a bearing 40 on a spindle 42, and confined against endwise movement to the right in Figure 1 by a ring 44 held by a cross bolt 46.

The spindle 42 is an integral portion of a part formed with a vertically-arranged cylinder 48 having ways on its sides embracing slides 50 secured by means such as pins 52 to a part such as a housing 54 which may be secured in any desired manner to the aeroplane proper.

The part 54, which may be regarded generally as the equivalent of an axle, is provided with a hollow piston 56 having a head 58 arranged in the cylinder 48. At its center the head 58 of the piston is provided with a bushing 60 having an opening for a throttling device such as a tapered plunger 62 threaded into the bottom of the cylinder 48 and secured by a locknut 64. The opening through the bushing communicates by passages 66 through the sides of the hollow piston 56 with the space in the cylinder 48 above the head 58 of the piston. The piston is encircled by a suitable packing 68 held by bushings 70 arranged in the open upper end of the cylinder 48.

When the plane is on the ground the load is transmitted from part 54, or an equivalent axle, through a yielding block 72 of rubber or the like directly to the part which includes the integrally-connected cylinder 48 and the wheel spindle 42, thus transmitting the load directly to the wheel. At this time the head 58 of the piston is substantially in the dotted-line position shown in Figure 1.

When the aeroplane rises into the air, the weight of the wheel pulls the cylinder 48 down until the head 58 of the piston is in the full-line position shown in Figure 1. As this movement may take place as slowly as necessary, there is substantially no resistance to the movement of the oil or other fluid in cylinder 48 from above the head 58 to that part of the cylinder below the head 58. When the plane lands again, the head 58 of the piston is forced downwardly very suddenly so that the oil is forced through the opening in bushing 60, and through the passages 66, so rapidly that it interposes a high degree of resistance to the sudden movement, thus acting as a brake to insure gradual relative vertical movement of the plane with respect to the wheel, until the block 72 comes to rest on the upper side of the upper bushing 70. Due to the tapering of the plunger 62 this throttling action gradually increases during the stroke of the piston, and thus the hydraulic pressure is maintained substantially constant throughout the working stroke of the piston thereby absorbing maximum energy of impact with a minimum strain on the entire structure.

The oil or other fluid may be introduced into the cylinder 47 through the hollow piston 56 by means of a check valve 76 of any usual or desired form communicating with the interior of the hollow piston 56 through a passage 78.

While one illustrative embodiment of the invention has been described in detail, it is not our intention to limit its scope to that particular embodiment or otherwise than by the terms of the appended claims.

We claim:

1. Running gear comprising, in combination, a part having at one end a wheel spindle and at the other end a vertical fluid-containing cylinder, another part carrying the load and having a piston extending into said cylinder and formed with an opening, and a tapered throttle plunger carried by the first part and extending through said opening and a wheel mounted on the spindle, said wheel being so shaped that its load plane substantially bisects said piston and cylinder.

2. An aeroplane wheel supporting member comprising a spindle and an integral open ended piston cylinder formed in the spindle and intersecting the horizontal axis of the spindle.

3. An aeroplane wheel supporting member comprising a spindle, a wheel supporting flange mounted on the spindle, a piston cylinder formed integral with the spindle and disposed on one side of the flange and intersecting the horizontal axis of the spindle member.

4. Running gear comprising a spindle formed at one end with an open ended cylinder intersecting the axis of the spindle, an axle member slidable on the cylinder and formed with a part fitting into the cylinder and means to permit controlled reciprocation of said part in the cylinder.

5. Running gear comprising a spindle formed at one end with a cylinder intersecting the axis of the spindle, an axle member having a part engaging the interior of the cylinder and another part engaging the exterior of the cylinder and adapted to reciprocate with respect to the cylinder, said cylinder and last named part being so shaped as to prevent rotation.

6. Running gear comprising a dished wheel, a part rotatably supporting the wheel, a cylinder formed integral with said part, another part and intersecting the axis of said part flexibly supported by the first part having sections engaging the interior and exterior of said cylinder for guided reciprocating movement with respect thereto.

7. Running gear for aeroplanes comprising a dished wheel, a spindle for supporting the wheel, a cylinder formed integral with the spindle and intersecting the axis thereof, an axle engaging part formed with a piston adapted to reciprocate within the cylinder, and another part having sliding engagement with the outside of the cylinder, said cylinder and last named part being so shaped as to prevent rotation, and means coacting with the cylinder and piston to control the reciprocating movement.

ISAAC M. LADDON.
SIDNEY P. LYON.

CERTIFICATE OF CORRECTION.

Patent No. 1,930,720.

October 17, 1933.

ISAAC M. LADDON, ET AL.

It is hereby certified that error appears in the printed specification of the above numbered patent requiring correction as follows: Page 2, line 97, claim 6, strike out the comma and words ", another part" and insert the same after "part" in line 98; and line 102, same claim, after "thereto" insert a comma and the words said cylinder and one of said sections being so shaped as to prevent rotation; and that the said Letters Patent should be read with these corrections therein that the same may conform to the record of the case in the Patent Office.

Signed and sealed this 9th day of January, A. D. 1934.

F. M. Hopkins (Seal)

Acting Commissioner of Patents.

66, so rapidly that it interposes a high degree of resistance to the sudden movement, thus acting as a brake to insure gradual relative vertical movement of the plane with respect to the wheel, until the block 72 comes to rest on the upper side of the upper bushing 70. Due to the tapering of the plunger 62 this throttling action gradually increases during the stroke of the piston, and thus the hydraulic pressure is maintained substantially constant throughout the working stroke of the piston thereby absorbing maximum energy of impact with a minimum strain on the entire structure.

The oil or other fluid may be introduced into the cylinder 47 through the hollow piston 56 by means of a check valve 76 of any usual or desired form communicating with the interior of the hollow piston 56 through a passage 78.

While one illustrative embodiment of the invention has been described in detail, it is not our intention to limit its scope to that particular embodiment or otherwise than by the terms of the appended claims.

We claim:

1. Running gear comprising, in combination, a part having at one end a wheel spindle and at the other end a vertical fluid-containing cylinder, another part carrying the load and having a piston extending into said cylinder and formed with an opening, and a tapered throttle plunger carried by the first part and extending through said opening and a wheel mounted on the spindle, said wheel being so shaped that its load plane substantially bisects said piston and cylinder.

2. An aeroplane wheel supporting member comprising a spindle and an integral open ended piston cylinder formed in the spindle and intersecting the horizontal axis of the spindle.

3. An aeroplane wheel supporting member comprising a spindle, a wheel supporting flange mounted on the spindle, a piston cylinder formed integral with the spindle and disposed on one side of the flange and intersecting the horizontal axis of the spindle member.

4. Running gear comprising a spindle formed at one end with an open ended cylinder intersecting the axis of the spindle, an axle member slidable on the cylinder and formed with a part fitting into the cylinder and means to permit controlled reciprocation of said part in the cylinder.

5. Running gear comprising a spindle formed at one end with a cylinder intersecting the axis of the spindle, an axle member having a part engaging the interior of the cylinder and another part engaging the exterior of the cylinder and adapted to reciprocate with respect to the cylinder, said cylinder and last named part being so shaped as to prevent rotation.

6. Running gear comprising a dished wheel, a part rotatably supporting the wheel, a cylinder formed integral with said part, another part and intersecting the axis of said part flexibly supported by the first part having sections engaging the interior and exterior of said cylinder for guided reciprocating movement with respect thereto.

7. Running gear for aeroplanes comprising a dished wheel, a spindle for supporting the wheel, a cylinder formed integral with the spindle and intersecting the axis thereof, an axle engaging part formed with a piston adapted to reciprocate within the cylinder, and another part having sliding engagement with the outside of the cylinder, said cylinder and last named part being so shaped as to prevent rotation, and means coacting with the cylinder and piston to control the reciprocating movement.

ISAAC M. LADDON.
SIDNEY P. LYON.

CERTIFICATE OF CORRECTION.

Patent No. 1,930,720.                              October 17, 1933.

ISAAC M. LADDON, ET AL.

It is hereby certified that error appears in the printed specification of the above numbered patent requiring correction as follows: Page 2, line 97, claim 6, strike out the comma and words ", another part" and insert the same after "part" in line 98; and line 102, same claim, after "thereto" insert a comma and the words said cylinder and one of said sections being so shaped as to prevent rotation; and that the said Letters Patent should be read with these corrections therein that the same may conform to the record of the case in the Patent Office.

Signed and sealed this 9th day of January, A. D. 1934.

F. M. Hopkins (Seal)                                        Acting Commissioner of Patents.

CERTIFICATE OF CORRECTION.

Patent No. 1,930,720.             October 17, 1933.

ISAAC M. LADDON, ET AL.

It is hereby certified that error appears in the printed specification of the above numbered patent requiring correction as follows: Page 2, line 97, claim 6, strike out the comma and words ", another part" and insert the same after "part" in line 98; and line 102, same claim, after "thereto" insert a comma and the words said cylinder and one of said sections being so shaped as to prevent rotation; and that the said Letters Patent should be read with these corrections therein that the same may conform to the record of the case in the Patent Office.

Signed and sealed this 9th day of January, A. D. 1934.

F. M. Hopkins (Seal)             Acting Commissioner of Patents.